Feb. 23, 1937.  W. C. FLECK ET AL  2,071,518
FRUIT JAR HOLDER
Filed Feb. 6, 1936
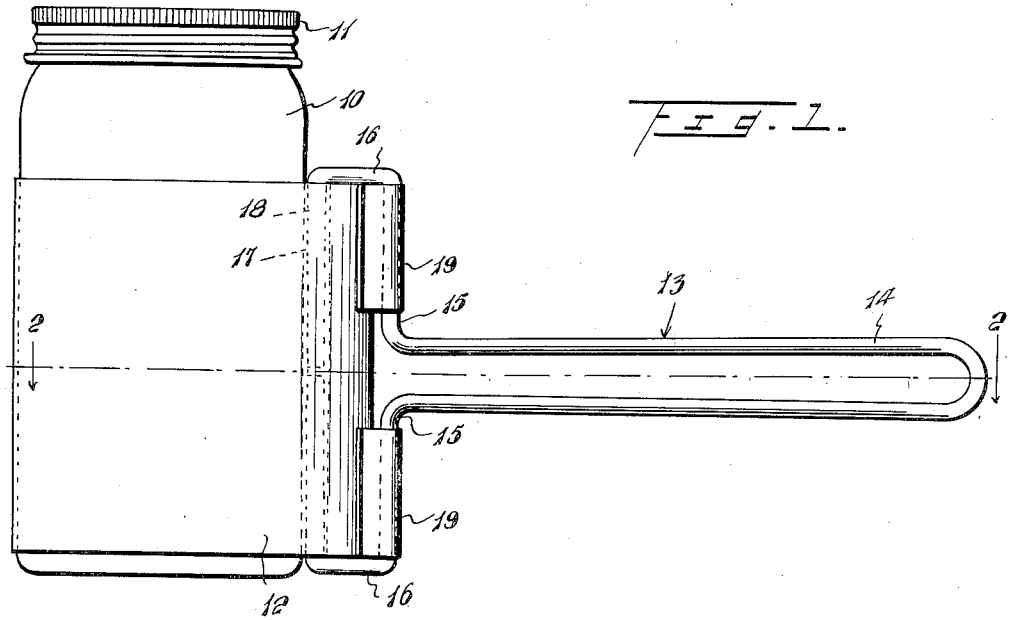
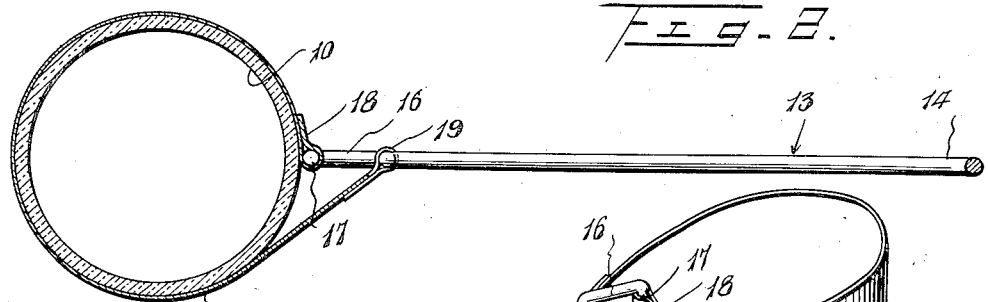
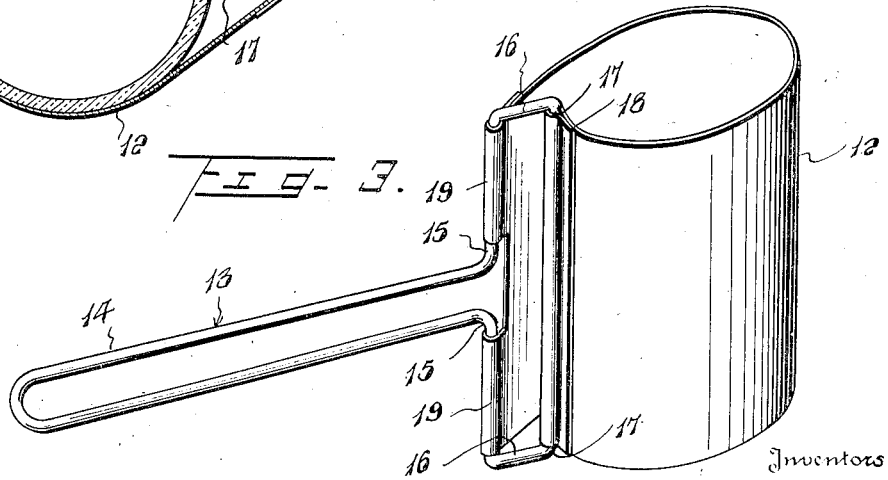
Inventors
Winfred C. Fleck, Charles F. Hyle
By L. F. Randolph Jr.
Attorney Patented Feb. 23, 1937

2,071,518

UNITED STATES PATENT OFFICE 2,071,518

FRUIT JAR HOLDER

Winfred C. Fleck and Charles F. Ayle, McKee, Pennsylvania

Application February 6, 1936, Serial No. 62,709

2 Claims. (Cl. 81—3.2)

This invention relates to a device adapted to hold fruit jars or the like while the caps or tops thereof are being applied or removed.

It is aimed to provide a novel construction having a relatively wide flexible metallic body adapted to surround the jar or the like and having opposite ends connected to spaced parallel or vertical portions of a handle or lever.

The more specific objects and advantages will become apparent from a consideration of the description following taken in connection with accompanying drawing illustrating an operative embodiment.

In said drawing:—

Figure 1 is a view in side elevation showing the invention applied to a fruit jar;

Figure 2 is a horizontal sectional view taken on the line 2—2 of Figure 1; and

Figure 3 is a detail perspective view of the device constituting our invention.

Referring specifically to the drawing, wherein like reference characters designate like or similar parts, a conventional fruit jar is shown at 10, having the usual screw cap 11, to facilitate an understanding of the invention.

The invention comprises a relatively wide or high band of flexible material 12, preferably sheet metal, and a handle or lever generally designated 13. Said handle or lever 13 has a double portion 14 constituting the handle proper and from which alined arms 15 extend in opposite directions. Horizontal portions 16 extend from the arms 15 and terminal portions 17 extend inwardly from the portions 16 in parallelism to the arms 15, and constituting additional arms. Such lever 13 is preferably made of relatively stiff wire.

One end of the band 12 is returned and soldered to the remainder, or otherwise formed into a sleeve 18, into which the arms 17 rotatably extend. The other end of the band 12 terminates in spaced sleeves 19, formed similarly to the sleeve 18, or in any other desired manner, and through the sleeves 19 the aforesaid arms 15 pass. The arms 17 and 15 are thus journaled in opposite end portions of a flexible metallic band 12.

In the use of the device, it is disposed about a jar 10, as best shown in Figures 1 and 2, and when the cap 11 of the jar is being applied or removed, the lever 13 is moved in the opposite direction to that of turning of the cap, whereby the band 12 very tightly and efficiently grips the jar 10, holding it against movement and facilitating the loosening of the cap 11.

Various changes may be resorted to provided they fall within the spirit and scope of the invention.

We claim as our invention:—

1. A device of the class described, comprising a flexible band, one end of said band having a sleeve, the other end of the band having-alined sleeves and a space therebetween, a lever member having an arm engaging the first-mentioned sleeve, arms engaging the second-mentioned sleeves, and a handle extending from the last-mentioned arms at said space.

2. A device of the class described, comprising a flexible band, one end of said band having a sleeve, the other end of the band having alined sleeves and a space therebetween, a lever member comprising a rod doubled intermediate of its ends to provide a handle located in said space, outturned portions providing arms engaging the alined sleeves, horizontal portions extending from said arms and the extremities of said rod bent towards one another into alinement and engaged in the first sleeve.

W. C. FLECK.
CHARLES F. AYLE.